Patented June 25, 1940

2,205,734

UNITED STATES PATENT OFFICE 2,205,734

COMPOSITION OF MATTER

Philip C. Scherer, Jr., Blacksburg, Va.

No Drawing. Application November 11, 1937, Serial No. 174,023

6 Claims. (Cl. 106—18)

The present invention relates to a process of producing compositions of matter adapted to be expanded by application of heat to form porous insulating materials.

The primary object of my invention relates to a composition of matter comprising a viscose solution, a gas-generating substance and a refractory material, said substance being able to react with said viscose solution with the formation of gas bubbles.

Another object of this invention has to do with a composition of matter comprising a viscose solution, a gas-generating substance of the group consisting of metals, metal alloys and metal compounds together with a refractory material.

Other objects of my invention will become apparent to those skilled in the art from a study of the following specification.

I am well aware that, heretofore, expandible compositions of matter have been prepared by mixing metals, etc., with mineral aggregates and cements with and without additional fillers (vide U. S. Patent 1,691,280 to Granville; U. S. Patent 1,804,753 to Douglas; U. S. Patent 1,819,018 to Eriksson; U. S. Patent 1,824,240 to Smith; etc.). Furthermore, I am well aware that U. S. Patent 2,047,187 to Becher of July 14, 1936, discloses a composition of matter consisting of viscose and exfoliated vermiculite, and that U. S. Patent 2,085,047 to Schneider of June 29, 1937, sets forth a composition of matter consisting of a cellulose ester solution and gas-generating carbonates.

By extensive experimentation, I have unexpectedly found that superior insulating materials can be obtained by admixing at least one refractory material with a viscose solution and a gas-generating substance and subsequently expanding the composition thus formed by application of heat, as set forth in my co-pending applications, Ser. No. 174,024, filed Nov. 11, 1937; Ser. No. 174,025, filed Nov. 11, 1937; and Ser. No. 174,026, filed Nov. 11, 1937.

Although I may use any gas-generating substance, such as metals, metal alloys, metal carbides, etc., which generates a gas in the form of fine bubbles by chemical interaction with viscose, I prefer to use a finely divided aluminum powder for reasons of economy. The amounts of gas-generating substances which are added to the viscose solutions may be varied at will, although I have found that an addition of about 0.1 to 0.3% of a finely divided aluminum powder gives the desired results, this percentage being calculated on the weight of the viscose solution. By increasing the amount of the gas-generating substance the porosity of the finished, i. e., expanded, product is increased and vice versa. The amount of cellulose contained in the basic viscose solution may also be varied within wide limits, although I prefer to use a viscose solution containing about 7% of cellulose by weight.

Refractory materials, employed in combination with my novel compositions of matter, are such substances which are not affected by water or alkalis, such as crushed stone, glass, barium sulphate, etc. They may be added to the viscose solution in any suitable proportion to form, after expanding the mixture, light, medium or dense porous insulating materials.

Organic fillers, such as wood flour, fibers, wood chips, straw, etc., and cementitious materials, such as lime, magnesium oxy-chloride cements, Portland cements, plaster of Paris, aluminum cements, etc., may be admixed with the refractory viscose mixture before it is used for the manufacture of porous insulating materials having the property of absorbing sound. Soaps, resins and other known water-proofing agents may be added to these compositions in suitable quantities.

Example 1

About 25 parts by weight of a crushed stone are admixed with about 70 parts by weight of a viscose solution (7%). Subsequently about 0.1 to 0.5 part by weight of a finely divided aluminum are dispersed in this mixture. Cementitious materials and/or organic fillers may be added to this composition. Other gas-generating substances in stoichiometric proportions may replace aluminum in this mixture.

Example 2

About 10 to 30 parts by weight of glass wool are mixed with about 70 parts by weight of a viscose solution (7%) containing about 0.1 to 0.5 part of aluminum powder by weight.

Organic fillers, such as wood flour, fibers, etc., and cementitious materials, such as lime, magnesium oxy-chloride cements, etc., may be added to this composition. Other gas-generating substances may replace aluminum in this mixture.

Although these examples will serve to illustrate my invention, I wish to emphasize that I do not wish to be limited to the same since these compositions as well as their individual ingredients may be varied at will to modify the physical and chemical characteristics of the porous insulating materials produced therefrom.

Modifications of my invention will readily be recognized by those skilled in the art, and I desire to include all such modifications coming within the scope of the appended claims.

I claim:

1. A composition of matter for the production of porous insulating materials comprising a viscose solution, a refractory material and a finely divided gas-generating substance selected from the group consisting of metals, metal alloys, and metal carbides, said substance being able to generate a gas in the form of fine bubbles by chemical interaction with said viscose solution.

2. A composition of matter for the production of porous insulating materials comprising a viscose solution, a refractory material and a finely divided gas-generating metal, said metal being able to generate a gas in the form of fine bubbles by chemical interaction with said viscose solution.

3. A composition of matter for the production of porous insulating materials comprising a viscose solution, a refractory material and a finely divided metal alloy, said alloy being able to form a gas in the form of fine bubbles by chemical interaction with said viscose solution.

4. A composition of matter for the production of porous insulating materials comprising a viscose solution, a refractory material and a finely divided metal carbide, said carbide being able to form a gas by chemical interaction with said viscose solution.

5. A composition of matter for the production of porous insulating materials comprising a viscose solution, a refractory material and a finely divided aluminum.

6. A composition of matter for the production of porous insulating materials comprising about 10 to 30 parts by weight of glass wool, about 70 parts by weight of a viscose solution containing about 7% by weight of cellulose and about 0.1 to 0.5 part of aluminum powder.

PHILIP C. SCHERER, Jr.